(12) United States Patent
Glasgow et al.

(10) Patent No.: US 10,517,403 B2
(45) Date of Patent: Dec. 31, 2019

(54) SEAT DEVICE TO CORRECT THE C-CURVE POSTURE WHILE SITTING

(71) Applicants: Shirley Diane Glasgow, Jacksonville, FL (US); Stacy Glasgow Steffes, Jacksonville, FL (US)

(72) Inventors: Shirley Diane Glasgow, Jacksonville, FL (US); Stacy Glasgow Steffes, Jacksonville, FL (US)

( * ) Notice: Subject to any disclaimer, the term of this patent is extended or adjusted under 35 U.S.C. 154(b) by 0 days.

(21) Appl. No.: 15/219,763

(22) Filed: Jul. 26, 2016

(65) Prior Publication Data
US 2018/0027972 A1 Feb. 1, 2018

Related U.S. Application Data

(60) Provisional application No. 62/282,265, filed on Jul. 29, 2015.

(51) Int. Cl.
| | | |
|---|---|---|
| *A47C 7/42* | (2006.01) | |
| *B60N 2/70* | (2006.01) | |
| *B64D 11/06* | (2006.01) | |
| *B60N 2/90* | (2018.01) | |

(52) U.S. Cl.
CPC ............ *A47C 7/425* (2013.01); *B60N 2/7005* (2013.01); *B64D 11/0647* (2014.12); *B60N 2002/905* (2018.02)

(58) Field of Classification Search
CPC .... A47C 7/425; B60N 2/2209; B60N 2/2222; B64D 11/0639
See application file for complete search history.

(56) References Cited

U.S. PATENT DOCUMENTS

| | | | | | |
|---|---|---|---|---|---|
| 2,591,306 | A | * | 4/1952 | Sherman ................ | A47C 7/425 297/118 |
| 4,471,993 | A | * | 9/1984 | Watson ................... | A47C 7/425 297/230.13 |
| 4,835,801 | A | * | 6/1989 | Walpin ................... | A47C 7/425 297/452.32 |
| D317,541 | S | * | 6/1991 | Carwile ........................ | D6/601 |
| 5,113,176 | A | * | 5/1992 | Harris .................... | A47C 7/425 340/573.7 |
| 5,551,752 | A | * | 9/1996 | Lovegrove ............... | A47C 7/46 297/284.4 |
| D383,027 | S | * | 9/1997 | Riedell ......................... | D6/596 |
| 6,254,189 | B1 | * | 7/2001 | Closson ................. | A47C 7/383 297/397 |
| 6,588,020 | B1 | * | 7/2003 | Stewart, III .......... | A47C 7/425 2/267 |
| 7,547,071 | B2 | * | 6/2009 | Huffman ................ | A47C 7/383 297/230.13 |

(Continued)

*Primary Examiner* — Philip F Gabler

(57) ABSTRACT

Seat with backs are constructed incorrectly. The problem is the curve at the thoracic region in the chair back that pulls a person into a c-curve skimp. All previous attempts to correct this problem focus on the wrong area (cervical, lumbar or full back) or are shaped/sized incorrectly. Our Seat Device to Correct the C Curve Posture While Sitting fixes this problem. It is does so for three reasons: because of its specific placement at the thoracic region only, that it is constructed to be evenly flat for support to hold the spine in correct alignment, and how the seat device attaches depending on specific seating challenges.

3 Claims, 8 Drawing Sheets

(56) References Cited

U.S. PATENT DOCUMENTS

| | | | | |
|---|---|---|---|---|
| 8,261,384 B2* | 9/2012 | Batiste | .................... | A47C 7/425 |
| | | | | 297/230.1 |
| 8,931,837 B2* | 1/2015 | Vernon | .................. | A47C 7/425 |
| | | | | 297/230.1 |
| 9,033,416 B1* | 5/2015 | Vanderhorst | ............. | A47C 7/46 |
| | | | | 297/284.5 |
| 9,045,064 B2* | 6/2015 | Weigert | ................. | B60N 2/806 |
| 2004/0026966 A1* | 2/2004 | Albersen | .............. | B60N 2/6081 |
| | | | | 297/188.06 |
| 2008/0164734 A1* | 7/2008 | Nile | ....................... | A47C 7/425 |
| | | | | 297/230.13 |
| 2008/0197688 A1* | 8/2008 | Tate | ..................... | A61B 5/6891 |
| | | | | 297/464 |
| 2010/0301655 A1* | 12/2010 | Mezger | .................... | A61F 9/04 |
| | | | | 297/397 |
| 2013/0226053 A1* | 8/2013 | Khan | ..................... | A47C 7/021 |
| | | | | 601/134 |
| 2015/0061332 A1* | 3/2015 | Dowell | .................. | A47C 7/383 |
| | | | | 297/188.01 |
| 2016/0338889 A1* | 11/2016 | Izutsu | ...................... | A61G 5/02 |

\* cited by examiner

SEAT DEVICE TO CORRECT THE C-CURVE POSTURE WHILE SITTING

CROSS-REFERENCE TO RELATED APPLICATION

This application claims the benefit of provisional patent application Ser. No. 62/282,265, filed 2015 Jul. 29 by the present inventors.

FIELD OF INVENTION

This invention, Device to Correct the C-Curve Posture While Sitting, relates to a back support that corrects the c-curve posture problem that is currently inherent in seats or chairs with a back. This is for anyone that has pain while sitting and anyone that does not want pain while seating.

BACKGROUND OF INVENTION

Back support cushions are well known to health care practitioners, manufacturers and regular people.

The reason that back support cushions are so popular is because most people are not at a neutral alignment in their posture as they go through daily life. This is exacerbated when they are sitting in a seat; vehicle, office, and airplanes especially.

There are many postural distortions, and we will not get into them all, but one of the most common is the C-Curve while sitting. This posture is characterized by forward head posture, a collapsed ribcage, flattened lumbar spine, protruding scapula, chin jutting forward, protruding spinous processes, anterior tilt to the pelvis and pain. A lot of pain, and ever increasing pain.

So people want support because of this, and most of the back supports provide a cushion that, provides support, for the postural distortion, and the person is collapsed into it. This does provide some relief for a time, but does not correct the underlying cause. This is obvious by the design of many back supports and by the verbiage that is used to describe them.

The spine should support itself when the alignment is corrected, and our device is a small assist to correct the problem with the seat, not a brace to hold you up. If you always have something holding you up, you lose functional strength.

The spine is a series of curves, the cervical curve, the thoracic curve, the lumbar curve. This is the S-Curve Posture. When in balance they create a straight line and are neutral in gravity.

Unfortunately, seats, regardless of whether they are an automobile seat, airplane seat, office seat or home seat, etc, are formed as if a person's posture should be a C-Curve. So when you lean back, your seat forces you into an unnatural C-curve whether you like it or not. This perpetuates all the aforementioned problems.

The following is a tabulation of some prior art that presently appears relevant:

| U.S. PATENTS | | | |
|---|---|---|---|
| Pat. No. | Kind Code | Issue Date | Patentee |
| 0,315,644 | A1 | Dec. 25, 2012 | Briscoe |
| 8,931,837 | B2 | Jan. 1, 2013 | Vernon |
| 4,835,801 | | Jun. 6, 2006 | Walpin |

People who have previously attempted to resolve this problem seem to think that the device needs to be large, fancy, structured, multifaceted and/or have multiple parts. But this is just not the case. Our simple device, with its support at just the right portion of the thoracic region corrects the entire spine and fills the gap in the seat that causes your body to form the C-Curve Posture instead of maintaining the neutral S-Curve Posture.

Most, devices now and previously have focused on the cervical and lumbar regions for support. If they happen to include the thoracic region they consistently have two problems.

(1) They are too thick (2) They are still pushing the spine out of alignment with the lumbar and/or cervical portions of the back pad.

The problem with those devices is that they have too much correction leading to an overcorrection that exasperates the problem.

But with the Seat Device to Correct the C-Curve Posture While Sitting that we have invented, the neutral sitting position can be found easily and quickly, and our Seat Device can be carried in a purse or briefcase, or hung on a carry-on. It is economical as well. Our Device is small and uncomplicated but unusual as well as very specific in its placement. Due to this the results are vast in size and scope.

PRIOR-ART

In general, the majority of back cushions focus on cervical or lumbar support, and they also consistently overcorrect. As with the following 3 examples of prior art:

U.S. Patent No. US 2008/0315644 A1. This cushion goes from the cervical region all the way down to the coccyx, and pushes the person forward, without changing the misalignment of the spine. Its goal seems to be to support the misalignment of the spine. This may take pressure off of the spine temporarily, creating a moment of relief. However, it exacerbates the forward head posture by pushing the head forward with the cervical support, which means that the person continues to fight the misalignment when they stand up.

U.S. Pat. No. 8,931,837 B2. This thoracic support goes from the cervical region to the lumbar region, with a 3-5 inch groove running the entire length, and cutouts for the scapulae. This is very bad. First, if the body is corrected from the C-Curve, the spinous processes are not protruding from the back. This shows that this support actually encourages the slumped forward position. Also, it is a very unique individual, with a true deformity that would have that much of their spinous procceses showing, even while curving forward. The cutouts for the scapulae are even worse. These actually force the scapulae to wing out, not allowing the normal neutral, flat, placement of the scapulae on the back. This means that this device promotes and enhances the C-Curve posture, and all of the pain and dysfunction that accompanies it.

U.S. Pat. No. 4,835,801. This back support cushion goes from the top of the thoracic region to the bottom of the lumbar spine. There are three clues that this supports the misalignment of the spine, one is that it has winged sides that force the shoulders forward into the unnatural rounded position. Two, it is thinner in the thoracic region to allow the thoracic region to become even more convex. Three, there is a bulge in the middle of it to 'pressure' the spine to "stimulate the neurosensory end organs". The spine should not be pushed on all the time (imagine someone gently poking your spine, all the time). So this is sending constant mixed messages to the body, round more, but then there is something 'pressuring' the spine as if something is poking at the sitter, trying to create a response to move. Again, this prior art is a support for the misalignment of the spine, rather than a device to correct the underlying postural problem. If the spine was just corrected to neutral, as with the Seat Device to Correct the C-Curve Posture While Sitting, then the person could relax into a correct alignment, rather than the slumping and shifting cycle that already aggravates so many people, even without the addition of a aggravating back device such as this.

Our seat device to correct the c-curve posture while sitting substantially corrects the underlying postural problem, regardless if you are sitting in a vehicle, a office chair, or an airplane. It is for anyone who has had pain while sitting, and anyone who does not want pain while sitting.

Together we have over 41 years experience as myofascial therapists and have dealt with a variety of pain problems. Typically, our clinic saw patients that had 'been through the mill'. They had been to traditional PT, massage, chiropractic, acupuncture, orthopedics, and even surgery. While the main emphasis was "hands on" work, our other focus was on ergonomics and how the way that they were sitting, related to their condition.

Through this we noted that even when we went to show our patients how to sit in their car, and they did everything they had been told, they were still being forced into a C-Curve posture by the design of the seat. This was exacerbating their condition and inhibiting their progress. We could tell what needed to be done to correct this, but could not find anything on the market.

So, in 1997 we started using a small folded towel to correct the c-curve, this of course had many drawbacks and was no long term solution, it did however show that something could be done, but neither of us had the time to create and manufacture a new device that could really solve the problem: A device that would be easy to use and economical.

Then when Shirley retired, we were told by many patients and other therapists that we now had no excuse and between the two of us we should be able to find the time to create the seat device that was needed. So on Apr. 22, 2015, we created the first prototype and have been met with much interest as we have progressed with testing.

People sitting in a forced C-Curve position is a severe, inadequately addressed problem, especially in automobiles and airplanes. The seat exasperates and continues the postural distortion, and at times is the cause of the postural distortion.

This distortion leads to Migraines, TMJD, Neck Pain, Rotator Cuff Strain, Cervical Pain, Thoracic Pain, Lumbar Pain, Hip Pain, Sciatica, Knee Pain, Leg Pain, and Neuropathies through all extremities, Decreased Cervical and Shoulder Range of Motion. Also, Shortness of Breath from the inability to fully expand the lungs due to the collapsed ribcage, protruding abdomen and exhaustion from fighting gravity.

These problems have been going on for years for these people, they are frustrated, upset and in pain. They have tried everything on the market, and their closets are filled with gadgets and complicated support systems that they had hoped would help. Unfortunately, none of them did. Some have even purchased new cars, top of the line cars that they love; but after driving for awhile, their pain becomes intense again.

Up until now this problem has not been resolved, the Seat Device to Correct the C-Curve Posture While Sitting substantially corrects this problem. It is now being used in offices; it has successfully flown in first class, business and economy seats all over the world; it is in a 19 year olds falling apart car, in 18 wheelers, in family cars and in the new, very fast GT-R. This Seat Device works.

Our Seat Device to Correct the C-Curve Posture While Sitting
(1) Corrects anatomical alignment
(2) Makes you sit erect, rise in height. Individuals have to adjust their rearview mirror since they are now looking at the backseat rather than the rearview window. This is now a guide. (They remember to never adjust it down again)
(3) Causes spine to lengthen and straighten, so no spinous processes have any pressure on them
(4) Rolls the shoulders slightly back and drops so the scapulae are flat on the back
(5) Lifts ribcage and opens the thorax
(6) Increases abdominal space, then the diaphragm can drop on inhalation and a deeper breath is achieved
(7) Allows organs to drop with the increased abdominal space, and can decrease heartburn and reflux
(8) Increases alertness
(9) Corrects forward head posture
(10) Has ease of use, the same device can be used in a car by a child or adult by a simple adjustment of the attachment When our device is placed and you sit correctly, and then it is removed, the differences are immediately noted because the individual is not able to sustain the correct position when the Seat Device to Correct the C-Curve Posture While Sitting is removed. They are shocked and want it back immediately. They can sit correctly only because of our device, and they get used to it instantly and do not want to go back to the dreaded C-Curve Posture. When it is removed the design flaw in the seat that pulls you into a collapsed C-Curve takes back over. However, now the individual is aware of collapsing and the benefits of a neutral position. The individual wants to sit correctly and has a new awareness that translates to when they are standing, moving, etc.

SUMMARY

The goal of this Seat Device to Correct the C-Curve Posture While Sitting is not to only help the person sit in neutral, or to fix the problem in a seat. It also creates awareness. Once aware, the person can apply the knowledge to different parts of their life, which can lead to a lasting change. That in turn leads to less pain, less medication, and less health care cost. AH of this is achieved with minimal effort on the individual's part.

Advantages:
It works. This might at first seem like an odd way to start the advantages but it is not. It is actually profound. There are literally tens of millions of people that are searching for relief from pain and what they have found to date has not worked! In fact, these supports have made the problems worse.

It is sad to say that literally tens, if not hundreds, of millions of dollars are spend for something that ends up in the closet, or even more sadly, used in a desperate hope for relief. Relief that does not materialize.

This is a serious problem. We asked ourselves why? Why didn't the many back supports of varied kinds do the job that the person had hoped it would. And we found it.

All of the products were either too hard, too structured, too large and made to support the wrong part of a regions of the back or the entire back. We can understand how this happed. It was intuitive and obvious to apply a support to the area of the spine that has a Concave Curve (Lumbar or/and Cervical regions). It was thought: oh, there is a weak spot in the spine so we should give it support. We will show later how wrong this philosophy has been.

This actually did not do what was need to correct the problems. What it did do was support a person in an incorrect posture which gave them the appearance/feeling of relief, from having to holding themselves up against gravity. What it actually was doing was supporting person into a constant incorrect spinal alignment that slowly but progressively making the problems worse.

Once this was first observed and supports started to be made on this invalid theory, everyone (like sheep) followed the leader since they could fall back on what had become an established fact to add the aura of validity to what they had produced.

Unfortunately: this was an INCORRECT OBSERVATION from the beginning and all the fruit born of that observation is also incorrect. The answer actually showed itself to us while working with thousands of our patients to teach them how to sit correctly. This truth held in every case from sitting in a car, office chair, airplane seat, lawn chair, dining room chair, etc.

Actually, the truth is COUNTER-INTUITIVE to common thought. This truth confirms that the ONLY support needed while seated, should be support at the CONVEX Curve (Thoracic Region) of the spine. This truth is what led to our Seat Device to Correct the C-Curve Posture While Sitting. And this truth flies in the face of all current belief. Which is why the Seat Device to Correct the C-Curve Posture While Sitting Works! And it is also why hundreds of thousands of back supports made on the incorrect concept of lumbar, cervical support, full back support, bottom seat support or any groupings of these are either in the closet or giving false hope to millions of people.

The spine is marvelously designed. It is designed with its Concave Curve (Cervical), Convex Curve (Thoracic), Concave Curve (Lumber), Convex Curve (Sacral) System to allow us to stand and sit will perfect ease and totally erect. The problem comes from the way seating is made. The back portion of nearly all seats and chairs have an indentation (regardless of whether it is slight or deep) that causes the Convex (Thoracic Region) portion of the spine to collapse into it and become MORE Convex than it should.

When the gentle Convex Curve (Thoracic Region) of the spine is made to have an increase in the Convex Curve, all of the problems start. But when the gentle Convex Curve is allowed to be maintained while seated these problems do not even appear. But let's be clear here. The Convex Curve (Thoracic Region) of the spine must maintain the gentle curve, over correcting is as bad as correcting the wrong regions of the spine (Lumbar and/or Cervical) or having a support that covers several or all regions.

Again, let's be clear, every car seat, office chair and airplane seat has an indentation that distorts and increases the Convex Curve (Thoracic Region) in the spine. The Seat Device to Correct the C-Curve Posture While Sitting allows you to maintain the gentle Convex Curve while seated.

ALLOWS is a very important word here. Our Seat Device to Correct the C-Curve Posture While Sitting does not work by forcing an alignment, it simply corrects the seat (any seat with a back) and ALLOWS your spine to flow into its correct position. It does and it will do it every time!

We are going to give a list of things that happen to you when you sit with our Seat Device to Correct the C-Curve Posture While Sitting. These things DO NOT happen with any other back supports, they cannot happen. These advantages you have while using this device are:

(1) Correct Spinal Alignment
(2) Relieves pressure on spinal disc and vertebra
(3) Causes an automatic lengthening of the spine
(4) Rotates the shoulders back and broadens the expansive of the chest
(5) Lifts the ribcage and opens the thorax
(6) Increases the abdominal space
(7) Allows for deeper inhalation for more oxygen with no effort
(8) Allows space for organs to drop so the stomach is not jammed against the esophageal sphincter reducing or eliminating reflux
(9) Increases alertness
(10) Corrects forward head posture
(11) Portable and light
(12) Can be used by children and adults
(13) Acts as a shock absorber in the car or on the plane
(14) Transfers the correct spinal alignment from sitting to standing as your body permanently adapts to the changes you achieve while sitting, correctly
(15) Automatically changes the position in which you sit on the bottom of the seat
(16) Changes the alignment of your legs and feet
(17) Corrects arms and hands to a proper alignment
(18) Non-intrusive in feel
(19) Not overly structured
(20) Gentle in support, as a light touch is all that is needed.
(21) Keeps your stomach from being compressed and pouching out
(22) Stops the pull of gravity that makes us so tired, as the posture is now neutral
(23) Non-intrusive in movement
(24) The cervical, thoracic, lumbar, and sacral regions become stacked and now have very strong support. And this is specifically because our Device to Correct the C-Curve Posture While Sitting only touches the thoracic region allowing the body to do what it naturally wants to do.

We would like to leave this section with a comment from an actual event that was told to us by a patient that purchased one for his car, one for his office chair, and one for the airplane He stated, "My back did not hurt and my leg did not get numb when driving, and at the end of the work day I was less tired and my neck and shoulders were not sore from working on the computer all day and sitting, at my desk. He said that he had just gotten back from a business trip to the coast, which he had to make frequently for business. He said he had always dreaded these trips because of all the pain he was in during and after the flight. Now he says that he will never again dread these business trips after flying with our Device to Correct the C-Curve Posture While Sitting for the airplane! He said he loved all of them and would never be without one again. He came back in and purchased one for his wife and one for his mother for their cars, as Christmas gifts. After they received them, he received three comments within the hour.

His wife texted that she was thrilled and could tell the difference as soon as she started using it. Then his mother called, who stated she was driving in no pain for the first time in years, and loved hers. Thirdly, the one that touched him the most, was from his eighteen year old daughter. "Dad" she said "Where's mine"? He came in New Year's Eve and got her one and said this to us. "I'm thrilled, can you imagine, starting at just eighteen using something that will make a physical difference in her health for the rest of her life. I could not be happier."

Then another person, a 67 year old retired physician that lives in the northeast and always took the auto train to Florida to visit his daughter purchased one. After using our Seat Device to Correct the C-Curve Posture While Sitting, he decided to drive the 18 hours trip for the first time in 10 years. He told us, "I had a great trip. I had planned to stop along the way, if I needed to, but I found out that I didn't need to stop. I was not even stiff or sore, and most of all I was not fatigued from the straight though trip. The difference in the oxygen that I was getting, since my lungs were not compressed by slouching, made it the best trip I has ever driven."

There is so much that could be said about the Seat Device to Correct the C-Curve Posture While Sitting, but suffice to say it does just enough to correct all the seated problems. It allows your body to sit not only without pain, but in absolute comfort. It works!

DRAWINGS—REFERENCE NUMERALS

Figure 1:
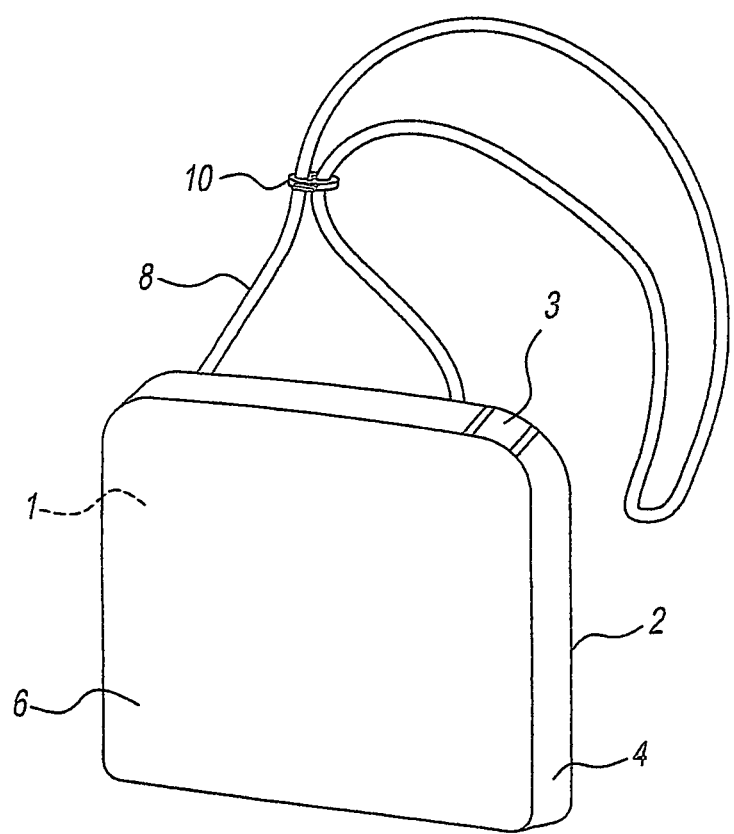
FIG. 1 is a front and side view of the flat pad with 2 radius cuts on the top right and left sides, a cover, an attachment and an adjuster for the Seat Device to Correct the C-Curve Posture While Sitting.
Figure 2:
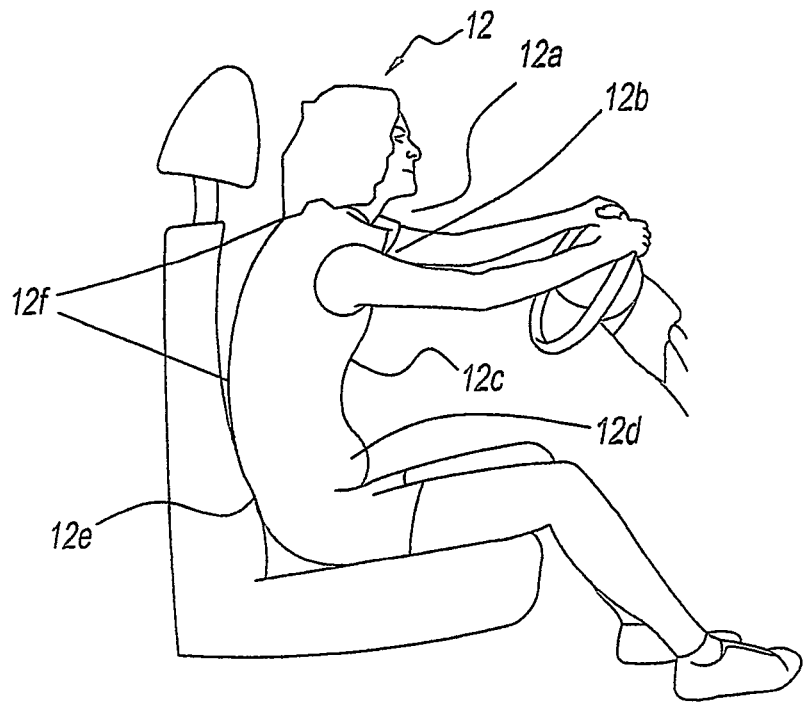
FIG. 2 is a side view of a person sitting in a car displaying the C-Curve posture.

FIG. 1
(1) flat pad which comprises the core
(2) Back cover
(3) Radius cut on the top right and top left side
(4) Side and even depth of the flat pad and the side cover
(6) Front cover
(8) Single attachment connected in two places
(10) adjustor FIG. 2
(12) Person sitting in C-Curve Posture, while driving
(12a) Forward head posture
(12b) Protracted shoulders
(12c) Collapsed ribcage
(12d) Shortened and protruding abdomen
(12e) Flattened lumbar spine
(12f) Protruding spinous processes, especially C7 and T12

Figure 3:
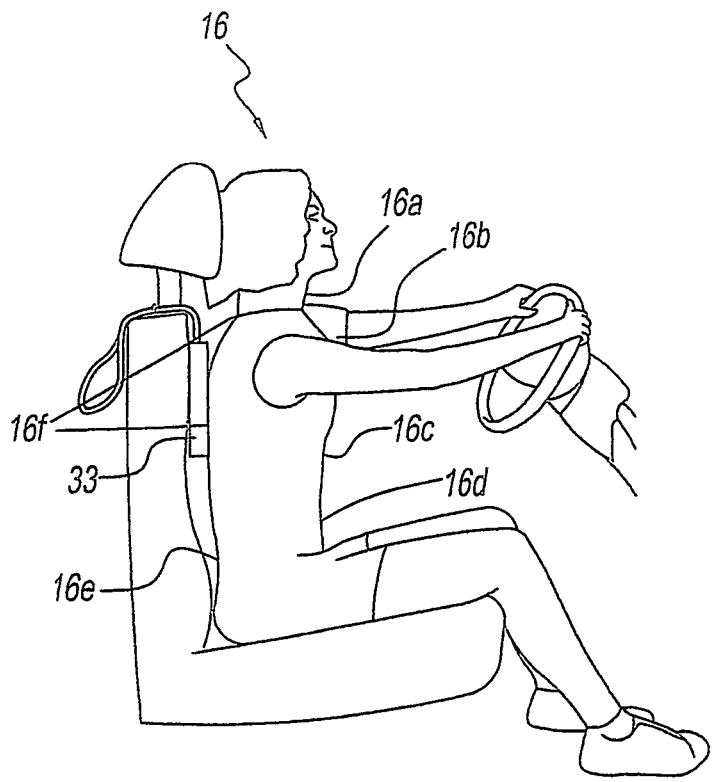
FIG. 3 is a side view of a person sitting in a car displaying a corrected posture using the: Seat Device to Correct the C-Curve Posture While Sitting.

FIG. 3
(16) Person no longer sitting in C-Curve Posture, while driving, since she is using the Seat Device to Correct the C-Curve Posture While Sitting
(16a) Neutral head position
(16b) Shoulders rotated back and down, the scapula retracted and lying flat on the back.
(16c) Ribcage lifted and at neutral
(16d) Abdomen lengthened
(16e) Corrected lumbar curve
(16f) Spine stacked in the neutral S-curve that it is meant to be in, which eliminates any protruding spinous processes.
(33) Seat device to correct the c-curve posture while sitting FIG. 4
(1) Flat pad which comprises the core
(2) Back cover
(3) Radius cut on the top right and top left side
(4) Side and even depth of the flat pad and the side cover
(6) Front cover
(8) Two attachments
(12) Single weighted adjustor FIG. 5
(20) Person sitting in C-Curve Posture in office chair
(20a) Forward head posture
(20b) Protracted shoulders
(20c) Collapsed ribcage
(20d) Shortened and protruding abdomen
(20e) Flattened lumbar spine
(20f) Protruding spinous processes, especially C7 and T12

Figure 6:
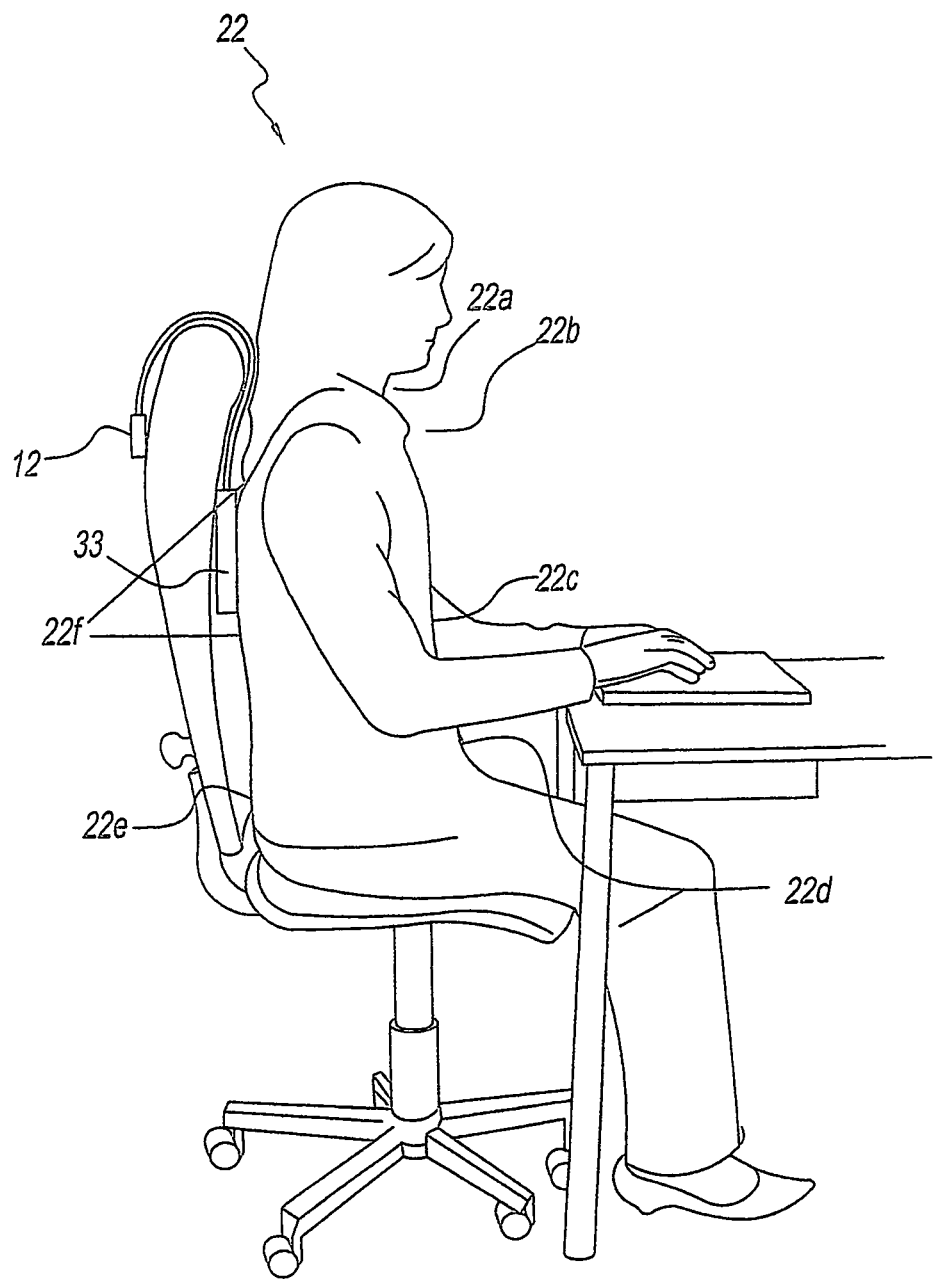
FIG. 6 is a side view of a person sitting in a freestanding chair displaying a corrected posture using the: Seat Device to Correct the C-Curve Posture While Sitting.

FIG. 6
(22) Person no longer sitting in c-curve posture, since she is using the seat device to correct the c-curve posture while sitting
(22a) Neutral head position
(22b) Shoulders rotated back and down, the scapula retracted and lying flat on the back.
(22c) Ribcage lifted and at neutral
(22d) Abdomen lengthened
(22e) Corrected lumbar curve
(22f) Spine stacked in the neutral S-curve that it is meant to be in, which eliminates any protruding spinous processes.
(33) Seat device to correct the c-curve posture while sitting FIG. 7
(1) Flat pad which comprises the core
(2) Back cover
(3) Radius cut on the top right and top left side
(4) Side and even depth of the flat pad and the side cover
(6) Front cover
(8) Two attachments
(14) Two weighted adjustors FIG. 8
(40) Person sitting in C-Curve Posture in airplane seat
(40a) Forward head posture
(40b) Protracted shoulders
(40c) Collapsed ribcage
(40d) Shortened and protruding abdomen
(40e) Flattened lumbar spine
(40f) Protruding spinous processes, especially C7 and T12
FIG. 9
(50) Person no longer sitting in c-curve posture, since she is using the seat device to correct the c-curve posture while sitting
(50a) Neutral head position
(50b) Shoulders rotated back and down, the scapula retracted and lying flat on the back.
(50c) Ribcage lifted and at neutral
(50d) Abdomen lengthened
(50e) Corrected lumbar curve
(50f) Spine stacked in the neutral S-curve that it is meant to be in, which eliminates any protruding spinous processes.
(33) Seat device to correct the c-curve posture while sitting Detailed Description—an Embodiment—FIG. 1

The first alternate selected to illustrate our Seat Device is shown in: FIG. 1, (1) flat pad that comprises the core, (2) back cover, (4) side and depth of the flat pad, (6) front cover, (8) attachment, (10) adjustor; different materials, sizes and interconnections can be used for all components. In this embodiment, a foam pad with radius cuts on two corners could be covered in a soft material, and an attachment cord could be sewn in at the top, with an adjuster.

Operation—an Embodiment—FIG. 1

The Seat Device that was just made can now be used in any vehicle by slipping the attachment over the headrest and using the adjustor on the attachment to raise or lower the Seat Device to the proper height (which is substantially within the thoracic region)

Detailed Description—an Alternate Embodiment—FIG. 1

Figure 4:
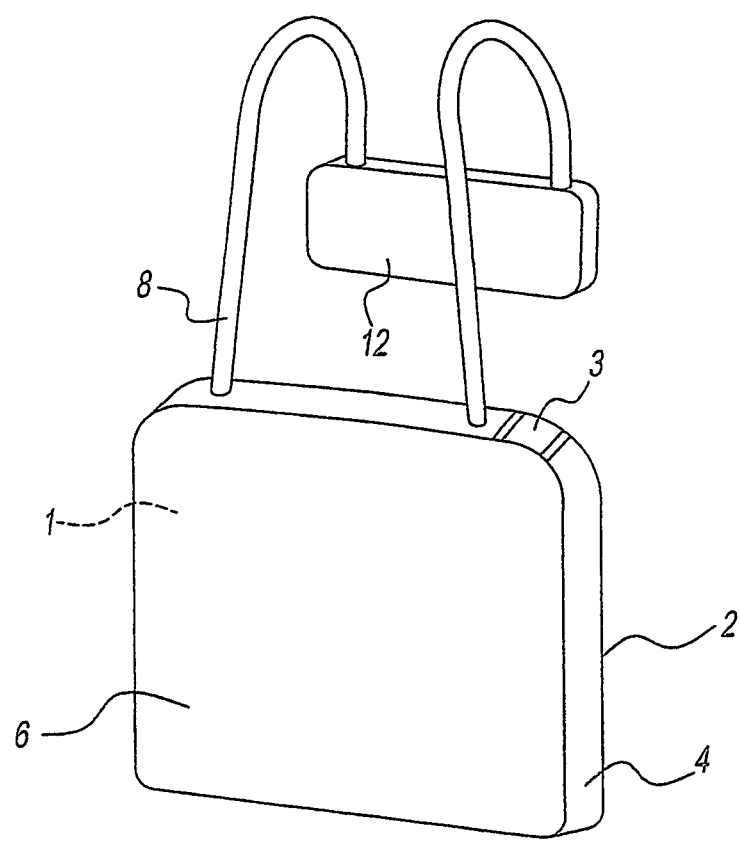
FIG. 4 is a front and side view of the flat pad with 2 radius cuts on the top right and left sides, a cover, an attachment and an weighted adjuster for the Seat Device to Correct the C-Curve Posture While Sitting. This is for the office, home, wheelchair, any freestanding chair.

The second alternate selected to illustrate our Seat Device is shown in: FIG. 4, (1) flat pad which comprises the core, (2) back cover, (4) shows the side and depth of the flat pad, (6) front cover, (8) two attachments, (12) single weighted adjustor; different materials, sizes and interconnections can be used for all components. In this embodiment, a foam pad with radius cuts on two corners could be covered in a soft material, and two attachments with a weighted adjustor at the end of each would complete it.
Operation—an Alternate Embodiment—FIG. 4
The Seat Device that was just made, as the alternate embodiment, can be used on any chair with a back. You place the flat pad on the back of the chair and lay the attachment with the weighted end over the back of the chair, and you adjust it higher or lower by simply reaching back and pushing it up or pulling it down, so it hits your thoracic region and anatomically corrects your spine.

Figure 7:
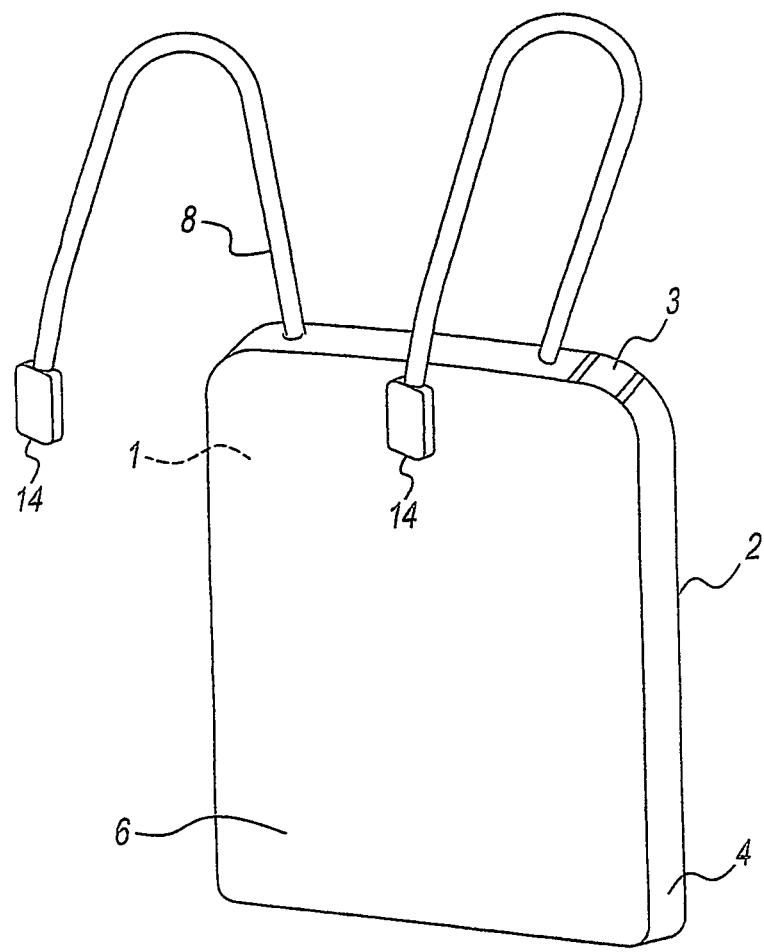
FIG. 7 is a front and side view of the flat pad with 2 radius cuts on the top right and left sides, a cover, an attachment and two weighted adjusters for the Seat Device to Correct the C-Curve Posture While Sitting. This is for use in an airplane, train, or bus.

Detailed Description—Another Alternate Embodiment 2—FIG. 7

The third alternate selected to illustrate our seat device is shown in: FIG. 7, (1) flat pad which comprises the core, (2) back cover, (4) side and depth of the flat pad, (6) front cover, (8) two attachments, (14) two weighted adjustors; different materials, sizes and interconnections can be used for all components. In this embodiment, a foam pad with radius cuts on two corners (the most narrow corners, so it hangs oblong) could be covered in a soft material, with 2 separate attachment cords sewn in, having weight adjustors at both ends, that are covered in the soft material.

Operation—Another Alternate Embodiment 2—FIG. 7

The Seat Device that was just made, as the third alternate embodiment, can be used with any airplane seat. After sitting in the seat, simply drop the seat device over your shoulders and down your back to fill the hole that is usually in the airplane seat. Now let the attachments drop between your body and your arms, out of the way. Slightly pull on the attachments to raise higher or lower, until it gets in the correct position to sit anatomically correct and comfortable.

CONCLUSION AND RAMIFICATIONS FIG. 2&3, FIG. 5&6, FIG. 8&9

Accordingly the reader will see that, according to the above embodiments of the invention, I have provided information to show the results of using the Seat Device for correcting the c-curve while sitting; note the anatomical changes below.

FIG. 2 illustrates (12) a person that is sitting in a typical C-Curve posture. The following are the components of the C-Curve posture, (12a) forward head posture, (12b) protracted shoulders, (12c) collapsed ribcage, (12d) shortened and protruding abdomen, (12e) flattened lumbar spine, (12f) protruding spinous processes, especially C7 and T12. This is the cause, or the aggravating factors, of the pain in your body from sitting.

FIG. 3 illustrates (16) a person sitting with corrected posture in neutral as a result from the seat device to correct the c-curve posture while sitting, placed at the lower two thirds of the thoracic region. (16a) neutral head position, (16b) shoulders rotated back and down, the scapula retracted and lying flat on the back, (16c) ribcage lifted and at neutral, (16d) abdomen lengthened, (16e) corrected lumbar curve, (16f) spine stacked in the neutral S-curve that it is meant to be in, which eliminates any protruding spinous processes.

The comparison between FIG. 2 and FIG. 3 is one example of a universal problem in automobile seats. It is evidenced by how much effort the automobile industry puts into changing, upgrading, and adding more settings to their seats. However, the problem has obviously not been resolved because people are still in pain when driving, and the industry keeps adding adjustments and the seats are still not correct. The problem is that they do not fix the right thing, and there is no other device, but ours, that does.

Figure 5:
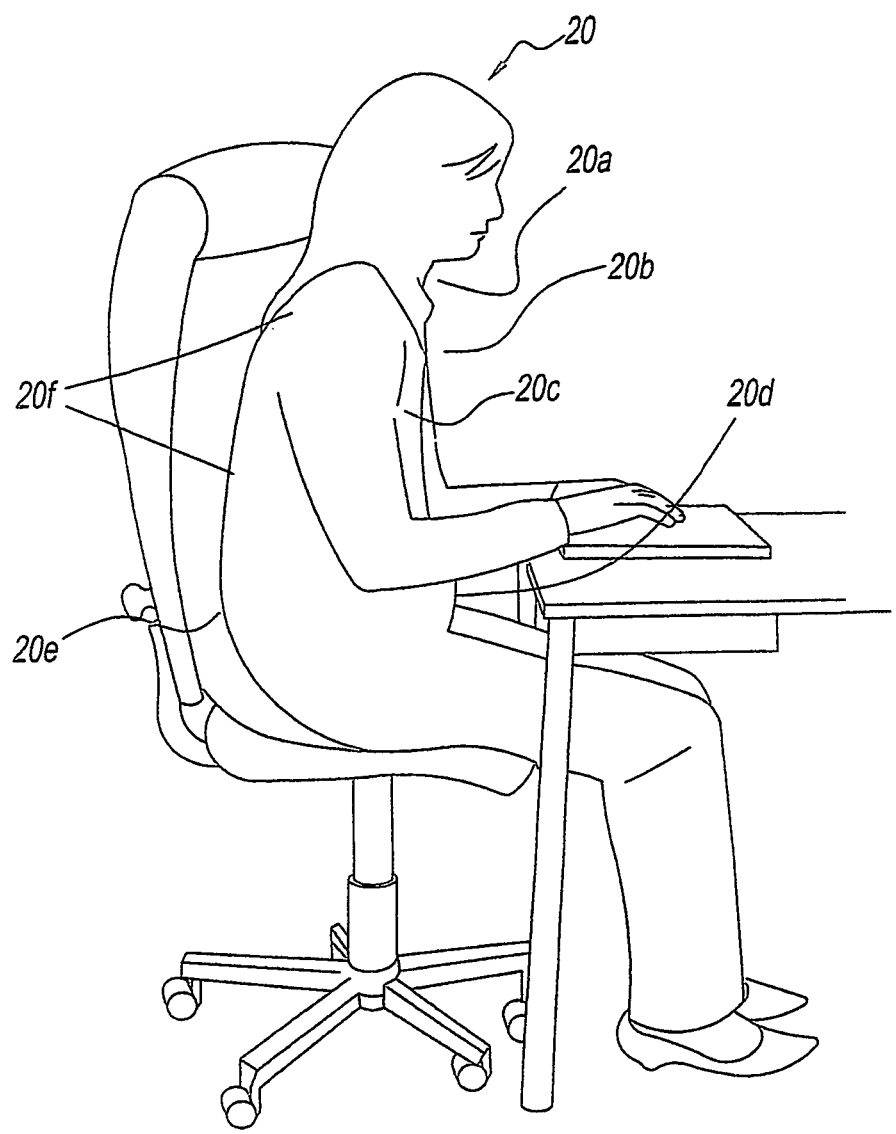
FIG. 5 is a side view of a person sitting in a freestanding chair, displaying the C-Curve posture.
Figure 8:
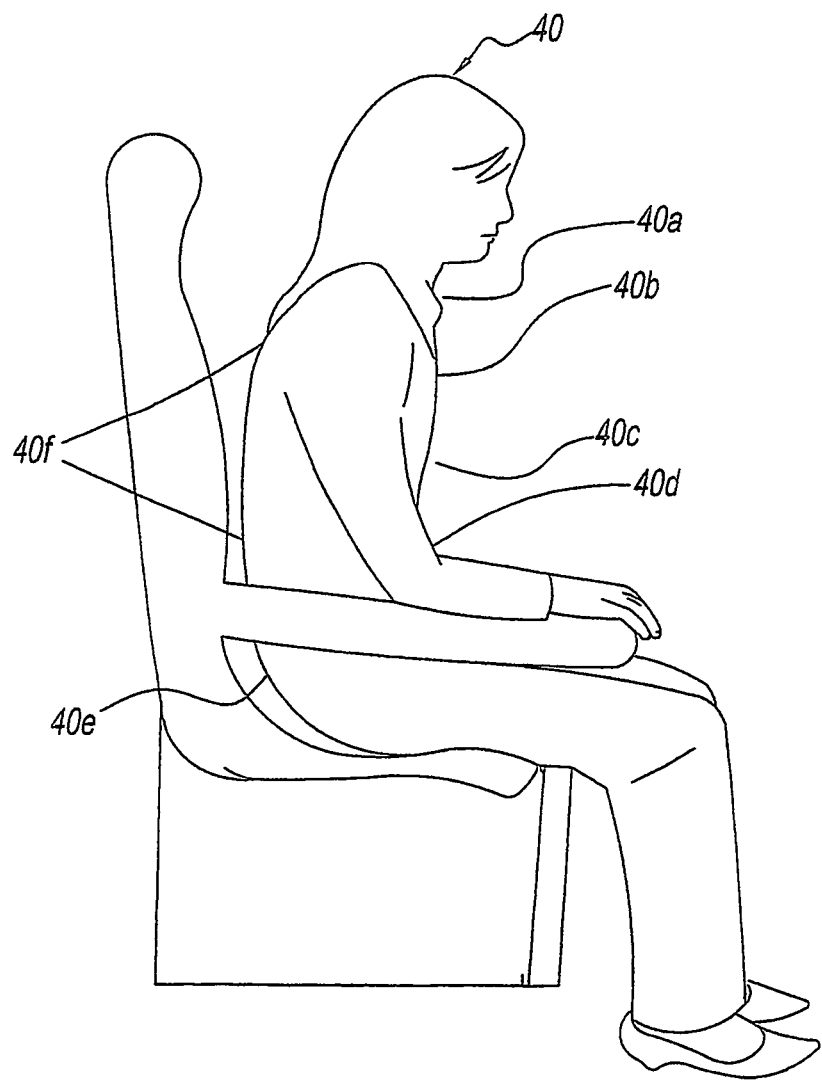
FIG. 8 is a side view of a person sitting ina n airplane seat, displaying the C-Curve posture.
Figure 9:
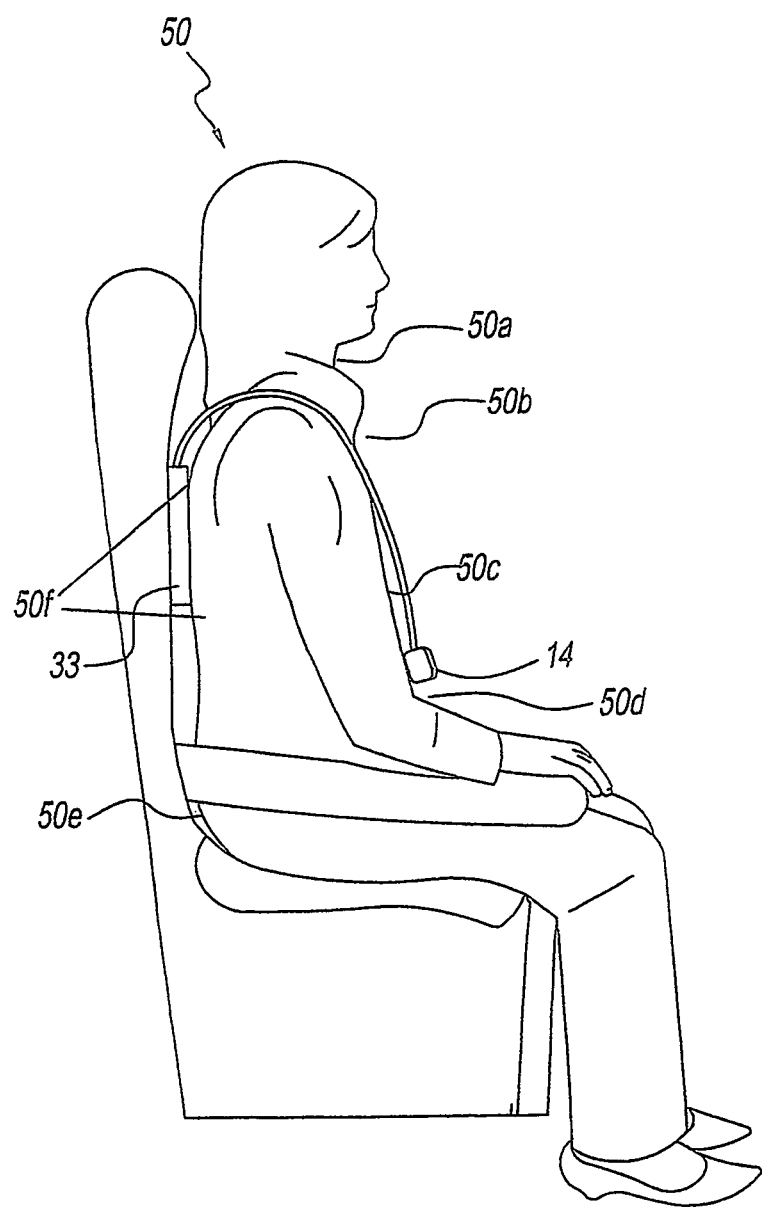
FIG. 9 is a side view of a person sitting in an airplane seat displaying a corrected posture using the: Seat Device to Correct the C-Curve Posture While Sitting.

FIGS. 5 & 6 show the same problem that happens with office chairs, and with FIGS. 8 & 9 there is a continuation of same problem and inadequate resolutions in airplane seats. There are so many devices for the cervical or lumbar regions out there, and that is not where we slump from, and these devices cannot be moved to the thoracic area to fix the problem. It must be flat to correct the problem in all seats, not a wedge, because a wedge creates the c-curve again. It cannot be too big or it will impede function. Our seat device shown here fixes the underlying root cause that creates so much discomfort with sitting in a car, in the office, and everyone knows, in the airplane.

There are the obvious effects which have been noted in detail, and then there are the other ramifications that are more subtle. Some examples are: increased oxygen intake while sitting, stability of the spine, less fatigue and an actual change from correct sitting to correct standing.

We claim:

1. A Thoracic Seat Device comprising;

a pad comprised of an evenly flat element of uniform thickness that has four corners, a back surface configured to stabilize the Thoracic Seat Device against a seating surface, a front section configured to provide support to the thoracic region of the spinal column of a user when the user is seated against the Thoracic Seat Device, the pad configured to fill a thoracic hollow in the seat surface; whereby the Thoracic Seat Device is configured to stabilize a seating position of the user and correct a c-curve posture of the user;

wherein the four corners of the element comprise an upper right corner, an upper left corner, a lower right corner, and a lower left corner, the upper right corner and upper left corner each having a radius cut configured to allow shoulder mobility for the user, while the lower right corner and the lower left corner are substantially square and without a radius cut;

a fabric cover comprising a back surface layer, wherein two attachments are stitched to an upper portion of the back surface layer and configured for securing the pad on the seating surface, and a front surface layer, wherein the front and back surface layers are attached to one another in proximity to their edges by stitching; and an adjustor, wherein the two attachments are joined to form a loop and the adjuster comprises a spring loaded clip arranged on the loop and configured for positioning the pad on the seating surface.

2. A Thoracic Seat Device comprising;

a pad comprised of an evenly flat element of uniform thickness that has four corners, a back surface configured to stabilize the Thoracic Seat Device against a seating surface, a front section configured to provide support to the thoracic region of the spinal column of a user when the user is seated against the Thoracic Seat Device, the pad configured to fill a thoracic hollow in the seat surface; whereby the Thoracic Seat Device is configured to stabilize a seating position of the user and correct a c-curve posture of the user;

wherein the four corners of the element comprise an upper right corner, an upper left corner, a lower right corner, and a lower left corner, the upper right corner and upper left corner each having a radius cut configured to allow shoulder mobility for the user, while the lower right corner and the lower left corner are substantially square and without a radius cut;

a fabric cover comprising a back surface layer, wherein two attachments are stitched to an upper portion of the back surface layer and configured for securing the pad on the seating surface, and a front surface layer, wherein the front and back surface layers are attached to one another in proximity to their edges by stitching; and wherein ends of the attachments distal the upper portion each include a weighted end configured for positioning the pad on the seating surface.

3. A Thoracic Seat Device comprising;

a pad comprised of an evenly flat element of uniform thickness that has four corners, a back surface configured to stabilize the Thoracic Seat Device against a seating surface, a front section configured to provide support to the thoracic region of the spinal column of a user when the user is seated against the Thoracic Seat Device, the pad configured to fill a thoracic hollow in the seat surface; whereby the Thoracic Seat Device is configured to stabilize a seating position of the user and correct a c-curve posture of the user;

wherein the four corners of the element comprise an upper right corner, an upper left corner, a lower right corner, and a lower left corner, the upper right corner and upper left corner each having a radius cut configured to allow shoulder mobility for the user, while the lower right corner and the lower left corner are substantially square and without a radius cut;

a fabric cover comprising a back surface layer, wherein two attachments are stitched to an upper portion of the back surface layer and configured for securing the pad on the seating surface, and a front surface layer, wherein the front and back surface layers are attached to one another in proximity to their edges by stitching; and wherein ends of the attachments distal the upper portion are connected to a single weight configured for positioning the pad on the seating surface.

* * * * *